Figures 1, 2:
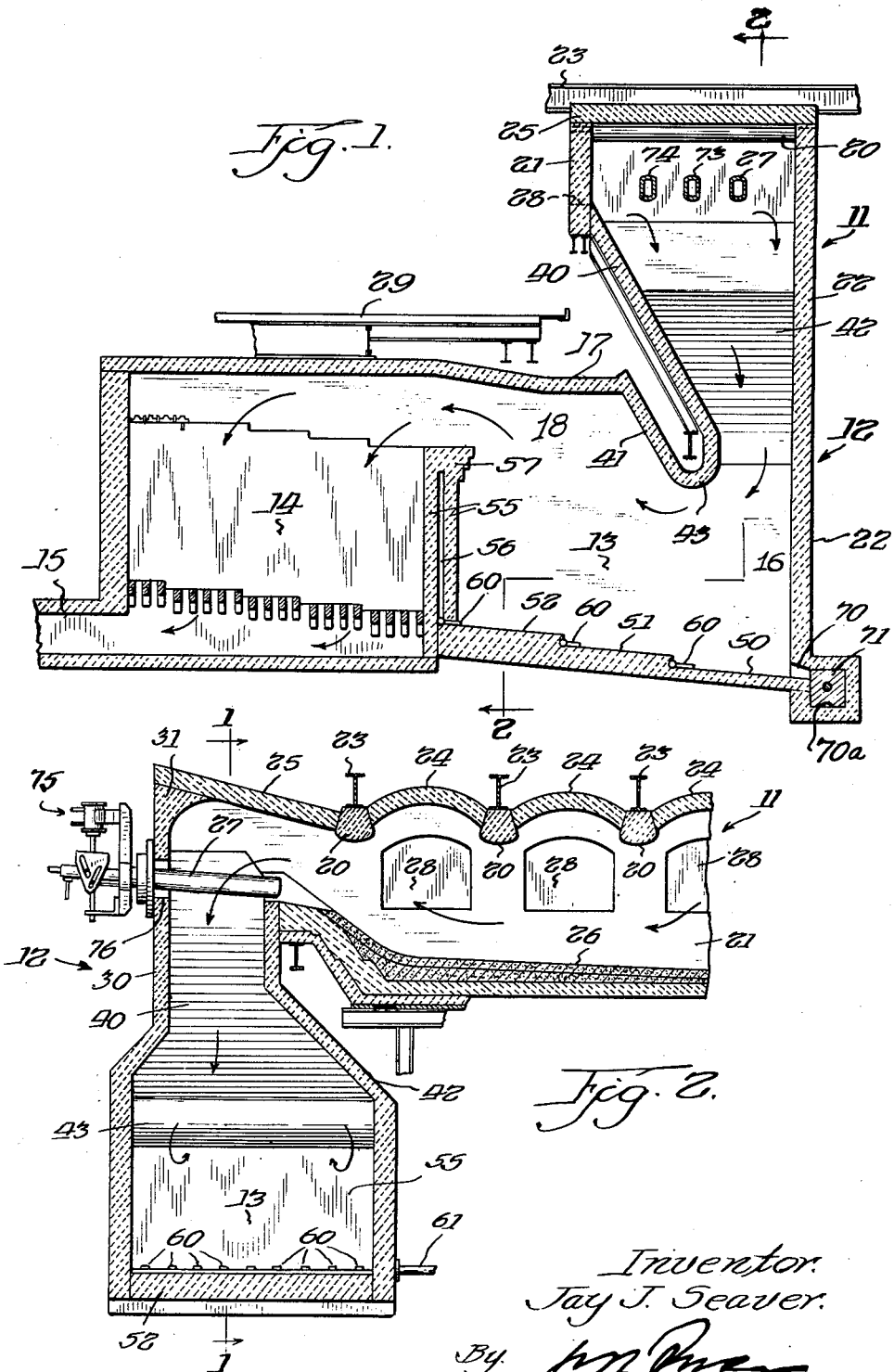

June 2, 1953     J. J. SEAVER     2,640,692
MEANS FOR SEPARATING SOLIDS FROM EXHAUST
GASES OF OPEN-HEARTH FURNACES
Filed March 15, 1950

Inventor.
Jay J. Seaver.

UNITED STATES PATENT OFFICE 2,640,692

MEANS FOR SEPARATING SOLIDS FROM EXHAUST GASES OF OPEN-HEARTH FURNACES

Jay J. Seaver, Evanston, Ill.

Application March 15, 1950, Serial No. 149,720

6 Claims. (Cl. 266—14)

This invention relates to open-hearth furnaces, and is particularly concerned with improvements directed to an open-hearth furnace comprising novel multiple burner means in connection with a novel hearth roof structure, and novel means for deflecting the exhaust gases on their path from the hearth bath to a regeneration chamber by way of a slag chamber in such a manner that solids entrained in the exhaust gases are efficiently deposited in the slag chamber for periodic removal therefrom prior to effecting reversal of an operating cycle.

Reference is made to copending applications, Ser. Nos. 273,848 and 273,849, filed February 28, 1952, which claim parts of the invention disclosed herein.

The various specific objects and features of the invention will be brought out in the course of the detailed description of certain embodiments, which will presently be rendered with reference to the accompanying drawings. In these drawings, Fig. 1 is a diagrammatic sectional view through portions of an open-hearth furnace taken approximately along line 1—1 in Fig. 2; and Fig. 2 illustrates in similar diagrammatic representation corresponding portions of the furnace in sectional view taken approximately along line 2—2 in Fig. 1.

Like parts are indicated by like reference numerals throughout the drawings. Known elements and details will be discussed only to the extent required for explaining what is considered new.

The open-hearth furnace shown in Figs. 1 and 2 includes the usual principal sections comprising the furnace hearth structure proper, which is generally indicated by numeral 11, two conduit sections—one at either end of the hearth structure and downwardly extending therefrom—one of these conduit sections being indicated at 12, each conduit section terminating in a slag chamber or pocket 13 and each slag chamber being associated with a so-called checker or regeneration chamber 14 containing suitable bricks through which the exhaust gases pass for heat exchange purposes and finally for exhaust through the flue 15 to a suitable stack. Solids entrained in the exhaust gases are precipitated into and deposited on the floor of the slag chamber 13; the gases free of solids passing through the checker chamber 14 transmit the heat to the bricks in such chamber, the bricks retaining the heat for heat-conserving purposes. The current is periodically reversed, after removing the solids deposited in the slag chamber 13, and fresh air is injected into the flue 15 for passage through the heated bricks in the checker chamber 14 where the air is pre-heated, passing then through the slag chamber and upwardly through the conduit 12 to the furnace hearth to sweep over the hearth bath to the other end thereof for exhaust through the conduit at such other end, which corresponds to the conduit 12, and further passage from this conduit to the corresponding slag chamber and thence through the associated checker chamber to the exhaust flue.

In the parlance of the art, the conduit 12 is referred to either as "downtake" or as "uptake," depending on the operation cycle during which the gases sweep either downwardly from the furnace hearth in the form of exhaust gases or upwardly as fresh pre-heated air to the furnace hearth to aid in the processing of the hearth bath.

The various features and aspects of the invention will now be described in detail against the background of the known furnace structure and operation as briefly sketched in a general way in the foregoing paragraphs.

As shown in Figs. 1 and 2, the roof of the furnace hearth comprises a number of transverse baffles 20 made of suitable high heat-resisting refractory material. These baffles extend between the hearth walls 21 and 22 on top thereof and may be suspended from beams 23. Disposed between each pair of baffles 20 is a transversely extending arch 24 made of suitable refractory material. At each end of the structure is disposed a terminal roof portion 25 likewise made of refractory material. It should be noted that the axes of the suspended arches 24 extend transversely of the longitudinal axis of the furnace hearth.

The hot gases created by the burners such as 27 and coming from the "uptake" 12 at the right end of the furnace hearth, as seen in Fig. 2, sweep over the hearth bath on the hearth floor 26 from right to left, as generally indicated by the arrows in Fig. 2.

In old structures provided either with a flat substantially horizontally extending hearth roof or with an arched roof having its axis disposed in parallel with the longitudinal hearth axis, and made in either case of contiguously placed refractory material, these hot gases caused destruction of the roof by relatively frequently burning out sections thereof, thus requiring frequent shutdowns for roof repairs, which usually necessitated replacement and practically rebuilding of the entire roof, or at least a major portion thereof.

In the new structure, the cross baffles 20 break up the upper layers of the hot gas stream and prevent sweeping of such stream in direct contact with and along the under side of the transverse arches 24. The new structure thus provides an air pocket underneath each transverse arch 24, protecting such arch against direct contact with the hot gas stream and thus prolonging its life. The transverse baffles 26, as already mentioned, are made of suitable high heat-resisting refractory material that can withstand a great amount of heat over relatively long periods of time. One or the other transverse baffle or one or the other suspended arch may show in time signs of burnout or breakdown. The necessary repair or rebuilding will then be restricted to a relatively small section of the roof instead of involving practically the entire roof, or a major portion thereof.

The new hearth roof structure therefore reduces the extent of damage from burnouts that may be caused in the operation of the furnace over relatively extended periods of time, thereby diminishing the frequency of shutdowns due to burnouts, thus contributing to the efficiency and economy of operation and reducing maintenance expenses.

Numerals 28 indicate the charging doors provided in the hearth wall 21 facing the charging floor diagrammatically indicated in Fig. 1 at 29.

The vertical wall 30 (Fig. 2) of the furnace terminates on top in a curved inner portion 31 which strengthens the roof-supporting structure, and by its interiorly streamlined configuration guides the flow of gases during either operating cycle, whether the gases flow from the hearth bath downwardly through the "downtake" 12, as shown in Figs. 1 and 2, or in opposite direction. The provision of the streamlined wall portion 31 thus prevents eddies, therefore gas friction along the path of the gas flow at the opposite ends of the furnace hearth, thereby further contributing to the efficiency and economy of operation.

The novel structure for deflecting the exhaust gases on their passage from the furnace hearth through the "downtake" 12 to the slag chamber 13, so as to deposit in the slag chamber the solids entrained in the gas stream, comprises a downwardly and laterally angularly inwardly inclined deflector formed by the wall portions 40, 41 disposed opposite the wall 22, as seen in Fig. 1, and forming with the walls 30 and 42, as indicated in Fig. 2, a downwardly converging passage, thus gradually flattening the exhaust gas stream in transverse direction, as seen in Fig. 1, and gradually widening the stream transverse of the axis of the slag chamber, to the width of such chamber, as is apparent from Fig. 2. The deflector wall portions 40, 41 are joined at the bottom thereof by a curved transverse portion 43 which by its streamlined configuration guides the flow of the flattened stream of exhaust gases into the top portion 18 of the slag chamber 13, underneath the roof portion 17 of said slag chamber, avoiding eddies and therefore gas friction at the point where the gas flow turns abruptly from downflow to angular side and upflow. The position of this transverse streamlined portion 43 of the deflector walls coincides substantially with the lower end of the downtake passage or conduit, where such conduit terminates in the slag chamber.

The effect of the above described deflector structure is that the stream of exhaust gases coming from the hearth bath and containing entrained solids is gradually flattened and at the same time adjusted to the width of the slag chamber and directed at relatively high velocity diagonally against the inside of the vertical wall 22 of the slag chamber near and at the top of the chamber. The entrained solids are thus propelled at relatively high velocity at an angle against the wall 22 of the slag chamber, over the entire width thereof, and at the moment when the gas stream hits the wall 22, i. e., at the moment when it enters the slag chamber, the gas expands into the rearmost portion space 16 of such chamber, thus relatively suddenly reducing the velocity of its flow and permitting the heavy entrained solids to continue in the path of their travel for deposit on the downwardly inclined lowest portion or platform 50 of the stepped floor of the slag chamber. It was found in actual operation that most of the gas-entrained solids and substantially all of the heavy particles were thus deposited on the inclined platform or portion 50 of the floor of the slag chamber. The gas stream expands further after passing the streamlined portion 43 of the deflector, entering the left portion or second expansion space 18 of the slag chamber and passing through such portion with low velocity which permits solids of intermediate weight and the lightest solids to precipitate within the slag chamber in angular direction to the left, as seen in Fig. 1, dropping down for deposit on the downwardly inclined portions or platforms 51 and 52 of the floor.

At 55 is indicated a partition which separates the slag chamber 13 from the regeneration or checker chamber 14. The partition may be air-cooled by providing therein ventilating passages 56. The top of the partition is shaped to form a deflecting baffle or projection 57 which may be made in stepped configuration, as shown, or may assume any desired form, projecting slightly into the slag chamber. Its purpose is to cause the ascending portion of the gas stream at the extreme left end of the slag chamber to be rearwardly deflected so as to promote separation therefrom of any residual lightweight solids. The purified gas stream, substantially free of solids, leaves the slag chamber, flowing over the partition 55 into the checker chamber 14.

Tests showed that it is possible by the use of the new structure to precipitate from the exhaust gas stream substantially the entire gas-entrained solids, that is, to all intents and purposes all gas-entrained solids and to deposit them in the slag chamber, as described above. The gas stream free of entrained solids flows through the brick maze in the checker chamber 14 for heat exchange and regeneration purposes mentioned before. The exhaust gas finally leaves the checker chamber through the flue 15 which connects with a suitable stack.

Each platform or portion 52, 51, 50 of the floor of the slag chamber 13 is provided with steam nozzles 60 branching from a suitable manifold carrying an inlet 61, as indicated in Fig. 2.

The solids deposited in the slag chamber are removed prior to effecting the periodic reversal of the operating cycle which involves reversal of the gas flow, as mentioned before. For this purpose there is provided a slotlike opening 70 extending across the width of the slag chamber 13 at the bottom thereof, as indicated in Fig. 1, this opening terminating in a discharge chamber 70a which is normally plugged by a ram 71. This discharge chamber 70a is disposed outside of the slag chamber proper, to keep it at lower temperature without requiring special cooling means. The ram 71 is withdrawn when removal of the slag is to be effected, and steam is injected into the manifolds feeding the various nozzles 60 in the rear of each of the platforms 52, 51, 50 of the floor of the slag chamber, the steam forcing the accumulated solids and washing them off to the right, as seen in Fig. 1, toward and through the opening 70 into the discharge chamber 70a. The ram 71 is then pushed through this discharge chamber, thereby pushing out the slag and solid particles deposited therein. It should be noted also that the discharge chamber 70a is disposed below the lowest point of the floor platform 50 to facilitate removal of the solids by the ram 71. The floor platforms 52, 51, 50 slope downwardly to effect efficient discharge of the solids into the discharge chamber 70a.

The furnace, after discharge of the precipitated solids, is now ready for another operating cycle in which the gas flow proceeds in opposite direction. Fresh air is for this purpose injected into the flue 15 for heat exchange flow and therefore pre-heating by and through the brick maze in the checker chamber 14 and continued flow of the pre-heated air through the "uptake" 12 for passage over the hearth bath, as in the previous cycle, but in opposite direction. The burners which had been operative during the previous cycle, disposed at the right end of the hearth as shown in Fig. 2, are shut down and the burners 27, 73 and 74, shown in Figs. 1 and 2, now become operative to process the material on the hearth floor 26.

The elimination of the volatile solids by means of the aforedescribed velocity deceleration and barrier system of trapping permits of the efficient collection and disposal of the stream borne slag factor within a single accessible enclosure which may be quickly and completely evacuated following each cyclic reversal. Also the brick maze in each of the checker chambers is thereby prevented from becoming fouled with slag encrustations and consequently deteriorated in heat exchange efficiency.

It is recognized that various changes may be made without departing from the essential spirit or scope of the invention. Accordingly, reference is had to the hereinafter annexed claims for an understanding of breadth of protection for which Letters Patent are desired to issue.

I claim:

1. In an open hearth furnace, an enclosure defining an intermediate hearth chamber flanked at opposite ends by downwardly extending conduits, downward continuations of said conduits defining a slag collection chamber and laterally therefrom a checker chamber, said conduits having therewithin progressively restricting passageways in a downward direction and entering their respective slag chambers at one end thereof opposite the related checker chamber, and said slag chambers having an expensive chamber volume immediately following its conduit passageway restriction for thereby abruptly reducing the velocity of gas flow thereat to effect the release by precipitation of gas borne solids before the gas stream enters its said checker chamber.

2. The combination set forth in claim 1 including a laterally coextension partitioning wall between said slag and checker chambers which comprises a duct cooled upstanding vertical portion and a gas stream encountering projection.

3. The combination set forth in claim 1 in which said slag chamber includes a floor comprised of a series of similarly inclined platforms progressively stepped in an ascending order in the direction of gas flow, and a channel affording a discharge chamber terminating the lowermost level platform of said series for collecting therewithin, subject to periodic disposal, the precipitated solids deposited upon and gravitated from said floor platforms.

4. In an open hearth furnace, an upper level enclosure defining a hearth chamber, vertical side portions each comprising an inner and an outer wall defining Venturi-like constricting passageways extending in downward directions one from either end of said hearth chamber level, a pair of lower level enclosures each defining collateral slag and checker chambers, said side portions each communicating with a related one of said slag chambers, and a deflector extending from the inner wall of each side portion into the corresponding slag chamber enclosure and terminating with a curved portion at an intermediate level within said slag chamber to guide down-draft gas flow streams into a course of direction change exceeding a full right angle at substantial coincidence with the gas flow velocity retardation which follows said passageway constriction.

5. The combination with an open-hearth furnace construction which comprises a horizontal upper level hearth chamber portion, a pair of lower level combined slag and checker chamber portions extending substantially at right angles to said hearth chamber portion in a vertical sense, and passageway conduits at opposite ends of said hearth chamber portion connecting the latter with said pair of lower level portions at one end of their respective slag chambers, of means for separating borne solids from a discharging gas stream while passing from said conduits through said slag chambers and toward said checker chambers which comprises a flow constricting portion at the lower extremity of each of said conduits, a portion of each slag chamber immediately following said constricting portion of the associated conduit having abrupt volume expanding capacity, and a vertical baffle upstanding between said slag and checker chambers having a lip overhang extending horizontally into the path of the gas stream.

6. In an open-hearth furnace, a generally horizontally disposed hearth, a gas flow conduit downwardly extending from said hearth at either end thereof, each conduit being defined on one side thereof by a substantially vertically extending outer wall, a slag chamber at the lowermost end of each of said conduits, a brick-containing regeneration chamber associated with each slag chamber and separated therefrom by a transverse partition wall which faces the corresponding slag chamber, the inner wall of each conduit being inclined downwardly and outwardly in the direction of the associated vertically extending outer wall to flatten and to constrict the gas stream flowing therethrough while at the same time adjusting the width of its passageway to that of the associated slag chamber, said constricted gas stream entering said slag chamber at relatively high velocity at the top of the rearmost section thereof adjacent said vertical outside wall and relatively suddenly expanding and being retarded within such rearmost section to cause heavy solids entrained in said gas stream to be thrust by inertia downwardly and become deposited on the floor of said slag chamber.

JAY J. SEAVER.

References Cited in the file of this patent

UNITED STATES PATENTS

| Number | Name | Date |
|---|---|---|
| 1,309,149 | Miller | July 8, 1919 |
| 1,365,436 | Worton | Jan. 11, 1921 |
| 1,430,713 | Worton | Oct. 3, 1922 |
| 1,941,411 | Mulholland | Dec. 26, 1933 |
| 2,151,264 | Cavanagh | Mar. 21, 1939 |
| 2,182,862 | Allardice | Dec. 12, 1939 |
| 2,236,920 | Robertson | Apr. 1, 1941 |
| 2,358,982 | Lewis | Sept. 26, 1944 |
| 2,509,029 | Antill | May 23, 1950 |
| 2,603,309 | Mercier | July 15, 1952 |

FOREIGN PATENTS

| Number | Country | Date |
|---|---|---|
| 589,395 | Germany | Dec. 12, 1933 |
| 408,752 | Great Britain | Apr. 19, 1934 |